United States Patent
Li et al.

(10) Patent No.: US 9,792,714 B2
(45) Date of Patent: Oct. 17, 2017

(54) AVATAR-BASED TRANSFER PROTOCOLS, ICON GENERATION AND DOLL ANIMATION

(71) Applicant: INTEL CORPORATION, Santa Clara, CA (US)

(72) Inventors: Wenlong Li, Beijing (CN); Xiaofeng Tong, Beijing (CN); Yangzhou Du, Beijing (CN); Thomas Sachson, Menlo Park, CA (US); Yunzhen Wang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 435 days.

(21) Appl. No.: 13/996,002

(22) PCT Filed: Mar. 20, 2013

(86) PCT No.: PCT/CN2013/072917
§ 371 (c)(1),
(2) Date: Jun. 20, 2013

(87) PCT Pub. No.: WO2014/146258
PCT Pub. Date: Sep. 25, 2014

(65) Prior Publication Data
US 2015/0379752 A1    Dec. 31, 2015

(51) Int. Cl.
*G06K 9/00* (2006.01)
*G06T 13/40* (2011.01)
(Continued)

(52) U.S. Cl.
CPC ............ *G06T 13/40* (2013.01); *G06F 3/0482* (2013.01); *G06F 3/04817* (2013.01);
(Continued)

(58) Field of Classification Search
CPC .. G06Q 30/0643; G06Q 50/01; H04L 67/306; H04L 12/582; G06F 3/167; G06T 13/40;
(Continued)

(56) References Cited

U.S. PATENT DOCUMENTS 7,468,729 B1 * 12/2008 Levinson ................ A63F 13/79
                                        345/419
2001/0051535 A1 * 12/2001 Kamimura ............ H04M 1/253
                                        455/566
(Continued)

FOREIGN PATENT DOCUMENTS

CN          1991982 A       7/2007
EP          0807902 A2     11/1997
(Continued)

OTHER PUBLICATIONS

Carretero et al.,Virtual characters facial and bodyanimat ion through the edition and interpretation of mark-up languages, 2005, Computers & Graphics 29 (2005), pp. 189-194.*
(Continued)

*Primary Examiner* — Vu Le
*Assistant Examiner* — Guillermo Rivera-Martinez
(74) *Attorney, Agent, or Firm* — Jordan IP Law, LLC

(57) ABSTRACT

Systems and methods may provide for identifying one or more facial expressions of a subject in a video signal and generating avatar animation data based on the one or more facial expressions. Additionally, the avatar animation data may be incorporated into an audio file associated with the video signal. In one example, the audio file is sent to a remote client device via a messaging application. Systems and methods may also facilitate the generation of avatar icons and doll animations that mimic the actual facial features and/or expressions of specific individuals.

25 Claims, 6 Drawing Sheets

(51) Int. Cl.
*G06T 13/80* (2011.01)
*G06F 3/0481* (2013.01)
*G06F 3/0482* (2013.01)
*G06F 3/0484* (2013.01)
*H04L 12/58* (2006.01)
*H04N 7/15* (2006.01)

(52) U.S. Cl.
CPC ..... *G06F 3/04842* (2013.01); *G06K 9/00315* (2013.01); *G06T 13/80* (2013.01); *H04L 51/046* (2013.01); *H04N 7/157* (2013.01)

(58) Field of Classification Search
CPC ..... G06T 19/003; G06T 17/00; G06T 19/006; G06N 3/006; G06N 5/02; G06N 3/008; G10L 13/00; G10L 21/00; G10L 21/06
See application file for complete search history.

(56) References Cited

U.S. PATENT DOCUMENTS

| | | | | |
|---|---|---|---|---|
| 2004/0130566 | A1* | 7/2004 | Banerjee | G06F 17/30017 715/716 |
| 2007/0067729 | A1* | 3/2007 | Danielson | G06F 9/4443 715/763 |
| 2007/0113181 | A1* | 5/2007 | Blattner | G06F 3/011 715/706 |
| 2008/0309675 | A1* | 12/2008 | Fleury | G06T 17/00 345/581 |
| 2009/0210213 | A1* | 8/2009 | Cannon | G06F 17/2288 704/2 |
| 2009/0276802 | A1* | 11/2009 | Amento | G06T 13/40 725/32 |
| 2010/0085363 | A1* | 4/2010 | Smith | G06T 13/40 345/473 |
| 2011/0131041 | A1* | 6/2011 | Cortez | G06T 13/205 704/235 |
| 2011/0221745 | A1* | 9/2011 | Goldman | G06Q 30/02 345/419 |
| 2012/0223952 | A1* | 9/2012 | Kanemaru | G06T 13/40 345/473 |
| 2013/0235045 | A1* | 9/2013 | Corazza | G06T 13/40 345/473 |
| 2014/0028712 | A1* | 1/2014 | Keating | G06T 19/006 345/633 |
| 2014/0267219 | A1* | 9/2014 | Jain | G06F 17/30247 345/418 |
| 2015/0070351 | A1* | 3/2015 | Tarquini | G06T 13/40 345/419 |

FOREIGN PATENT DOCUMENTS

| | | |
|---|---|---|
| KR | 100884467 B1 | 2/2009 |
| WO | 2006047347 A1 | 5/2006 |

OTHER PUBLICATIONS

Fu et al., Real-Time Multimodal Human—Avatar Interaction, Apr. 2008, IEEE Transactions on Circuits and Systems for Video Technology, vol. 18, No. 4, pp. 467-477.*

Hou et al., Humanoid Personalized Avatar Through Multiple Natural Language Processing, 2009, World Academy of Science, Engineering and Technology 35, pp. 230-235.*

Augustine, "SOEmote implants your facial expressions, movement, and voice onto your EQ2 avatar," Jun. 1, 2012. Retrieved at: http://www.pcgamer.com/2012/06/01/soemote-implants-your-facial-expressions-movement-and-voice-onto-your-eq2-avatar/#null on, 16 pages.

International Application No. PCT/CN2011/084902, filed Dec. 29, 2011, 21 pages.

International Search Report and Written Opinion dated Dec. 12, 2013 for International Application No. PCT/CN2013/072917.

Extended European Search Report for European Patent Application No. 13878950.8, dated Sep. 27, 2016, 9 pages.

Office Action for Chinese Patent Application No. 201380073462.X, dated Jun. 1, 2017, 31 pages including 15 pages of English translation.

* cited by examiner

AVATAR-BASED TRANSFER PROTOCOLS, ICON GENERATION AND DOLL ANIMATION

TECHNICAL FIELD

Embodiments generally relate to avatars. More particularly, embodiments relate to avatar-based transfer protocols, icon generation and doll animation.

BACKGROUND

Avatars may be used in virtual worlds such as game environments. Recent developments in avatar technology may package, transfer and process avatar data as video content, which may incur high bandwidth costs. Additionally, solutions may transfer avatar data in a real-time transport protocol (RTP) channel that relies upon dedicated avatar support in the remote peer.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
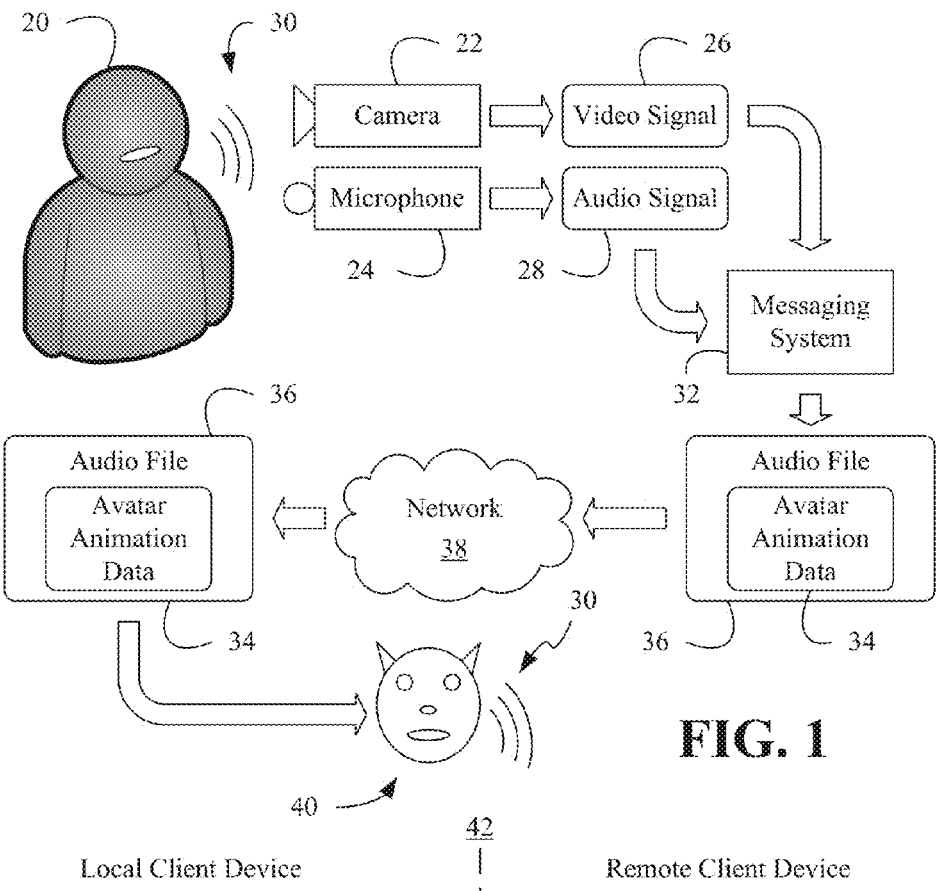
FIG. 1 is a block diagram of an example of an avatar transfer protocol according to an embodiment.

Turning now to FIG. 1, an example of an avatar transfer protocol is shown in which a subject 20 (e.g., individual, person, user, etc.) is captured visually and audibly by a camera 22 and a microphone 24, respectively. The illustrated subject 20 exhibits one or more facial expressions (e.g., mouth shapes, head turns, nods, blinks, frowns, smiles, winks) that are reflected in a video signal 26 and concurrently speaks audible content 30 (e.g., words, phrases, sounds) that is reflected in an audio signal 28. The video signal 26 and the audio signal 28 may be processed by a messaging system/application 32 that is configured to identify one or more facial expressions of the subject 20 in the video signal 26 and generate avatar animation data 34 based on the one or more facial expressions. As will be discussed in greater detail, the avatar animation data 34 may facilitate the generation of an avatar that visually and audibly mimics the subject 20 without revealing the true identity or likeness of the subject 20.

Additionally, the messaging system 32 may encode (e.g., compress) the audio signal 28 into an audio file 36 and incorporate the avatar animation data 34 into the audio file 36. Of particular note is that incorporating the illustrated avatar animation data 34 into the audio file 36 enables the avatar animation data 34 to be transferred across a network 38 (e.g., Internet, intranet) without incurring high bandwidth costs or relying on dedicated avatar support in the remote peer (e.g., remote client device). The illustrated audio file 36 and avatar animation data 34 are used to render an avatar animation 40 that mimics the facial expressions of the subject 20 and the audible content 30 spoken by the subject 20, without revealing the true identity or likeness of the subject 20.

In one example, the avatar animation data 34 includes timestamped facial motion data. The facial motion data may include various parameters that represent facial features and/or expressions such as, for example, the position of the subject's eyes, mouth, cheeks, teeth, eyebrows, etc., head turns, nods, blinks, frowns, smiles, winks, and so forth. Timestamping the facial motion data may facilitate synchronizing the animated facial expressions with the audible content 30 during rendering of the avatar animation 40. Additionally, the timestamped facial motion data may be stored to a free data field of the audio file 36. For example, a core audio format (CAF) file format might be used to specify the amount of facial motion data and the facial motion data itself as illustrated in Table I below.

TABLE I

| Field | Value |
| --- | --- |
| mChunkType | [facial_motion_data] |
| mChunkSize | Valid_size |

In another example, the avatar animation data 34 includes a link (e.g., Uniform Resource Locator/URL) to facial motion data, wherein the link may be stored in a sound metadata field of the audio file 36 (e.g., if an audio file format such as Internet Low Bitrate Codec/iLBC, Advance Audio Coding/AAC, etc., with no free data field is used). Thus, a file format as in Table II may be used in such a situation.

TABLE I

| Field | Value |
| --- | --- |
| SoundMetadata | [facial_motion_data_link] |

Figure 2:
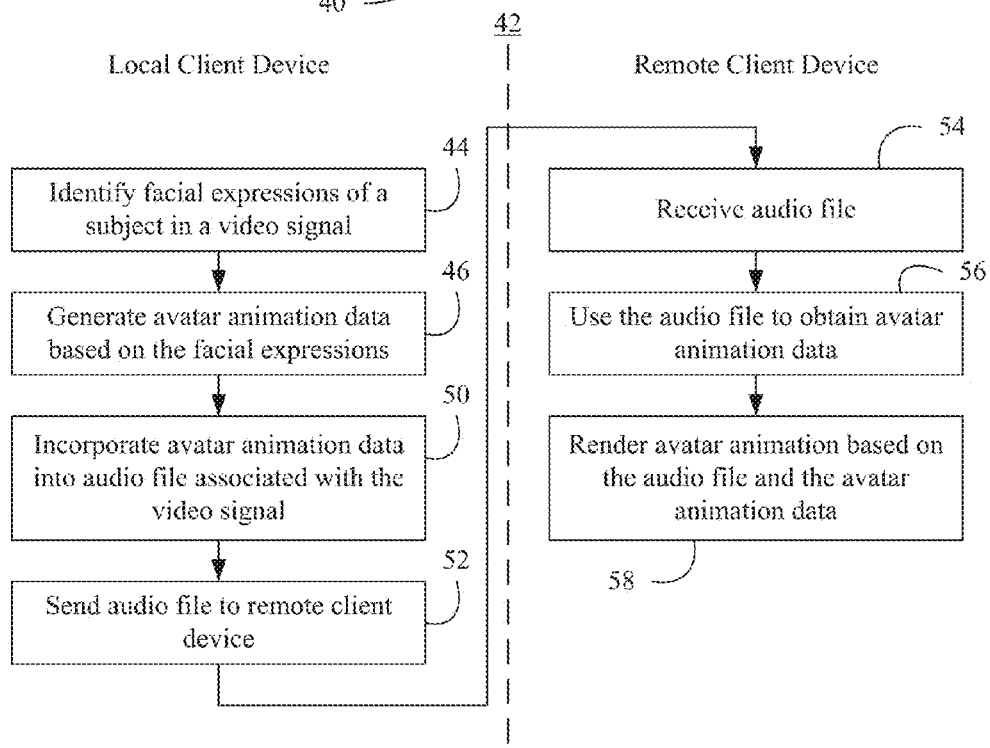
FIG. 2 is a flowchart of an example of a method of managing avatars according to an embodiment.

Turning now to FIG. 2, a method 42 of managing avatars is shown. The method 42 may be implemented in a client device as a set of logic instructions and/or firmware stored in a machine- or computer-readable medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 42 may be written in any combination of one or more programming languages, including an object oriented programming language such as C++ or the like and conventional procedural programming languages, such as the "C" programming language or similar programming languages. Moreover, the method 42 may be implemented using any of the aforementioned circuit technologies.

Illustrated processing block 44 provides for identifying one or more facial expressions of a subject in a video signal at a local client device (e.g., local peer). Avatar animation data may be generated at block 46 based on the one or more facial expressions, wherein illustrated block 50 incorporates the avatar animation data into an audio file associated with the video signal. As already discussed, incorporating the avatar animation data into the audio file may include storing timestamped facial motion data in a free data field of the audio file, storing a link to timestamped facial motion data in a sound metadata field of the audio file, and so forth. The facial motion data may describe facial motion such as mouth action, eye position, eyebrow position, and so forth, of the subject captured by the video signal. Thus, the facial motion data may describe the degree of eye opening, degree of mouth opening, position of the lip, nose tip, head rotation, etc.

The timestamped facial motion data might include, for example, 16-bit floating point data for each frame of the video signal. Of particular note is that a 10-second sound clip with facial motion data (at 25 frames per second and a 50% compression rate) may yield an audio file size of around 20 KB, whereas a conventional 10-second video clip may result in a file size of several megabytes. The audio file may be sent to a remote client device (e.g., remote peer) at block 52. In one example, the audio file is sent via a messaging application and/or system over a network connection.

Illustrated block 54 provides for receiving the audio file at a remote client device. The audio file may be used at block 56 to obtain avatar animation data, wherein an avatar animation may be rendered at block 58 based on the audio file and the avatar animation data. In one example, obtaining the avatar animation data involves retrieving timestamped facial motion data from a free data field of the audio file. In another example, obtaining the avatar animation data involves retrieving timestamped facial motion data from a link stored in a sound metadata field of the audio file. Rendering the avatar animation may involve synchronizing the timestamped facial motion data with the audio file.

Avatar Icon Generation

One type of application that may particularly benefit from the techniques described herein is avatar icon generation in a messaging environment. For example, a common occurrence may be for friends and/or acquaintances to share messages with one another in an online setting such as a social network, virtual forum, focus group, and so forth. The avatar transfer protocol already discussed may be readily applied in such settings to facilitate the generation and transfer of avatar icons in conjunction with shared messages.

Figure 3:
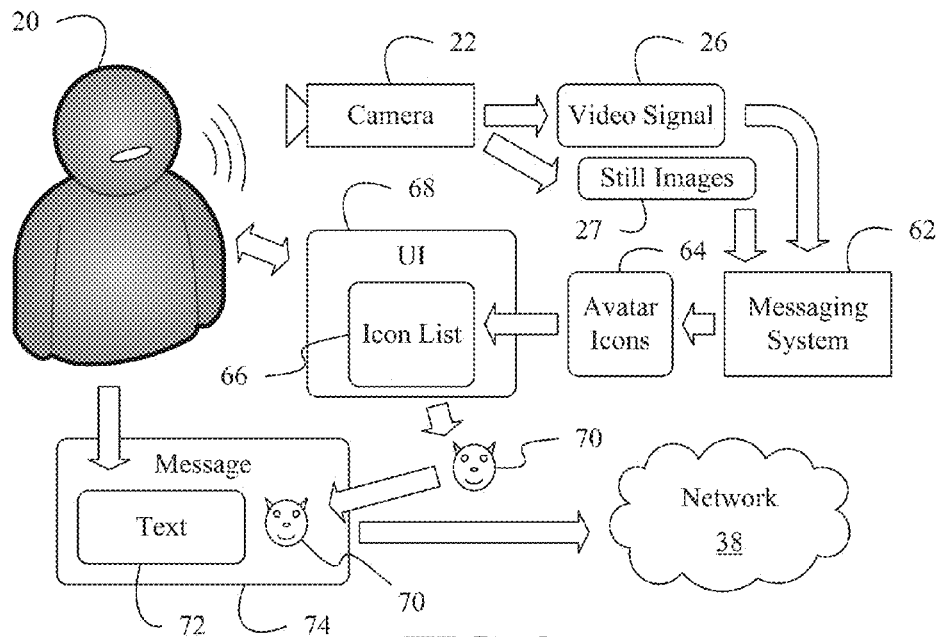
FIG. 3 is a block diagram of an example of an avatar icon messaging scheme according to an embodiment.

FIG. 3 shows an example of an avatar icon messaging scheme in which a subject 20 is captured by a camera 22, and a messaging system/application 62 identifies one or more facial expressions of the subject 20 in a video signal 26, as already discussed. The facial expressions of the subject 20 may also be captured by the camera 22 in still images 27. The illustrated messaging system 62 generates one or more avatar icons 64 (e.g., periodically, in response to a user request, and so forth) based on the facial expressions, which may be added to an icon list 66.

The icon list 66 may therefore contain a set of avatars having different facial features/expressions that reflect the facial features/expressions made by the subject during capture of the video signal 26 and/or still images 27. In this regard, the messaging system 62 may confirm that the avatar icons 64 are not duplicates before adding them to the icon list 66. The icon list 66 may in turn be presented to the subject 20 via a user interface (UI) 68, wherein user selections of an avatar icon 70 from the icon list 66 may be sent in conjunction with a message 74 (e.g., instant message/IM, posting, short messaging service/SMS, email, and so forth) to a remote client device over a network 38. The selected avatar icon 70 may also be transferred over the network 38 in an audio file, as already discussed.

In the illustrated example, the message 74 includes text 72 entered by the subject 20. The avatar icons 64 may be generated in "offline mode" while the user is entering the text 72 (e.g., periodically) and/or in "online mode" while the user is posing a specific facial expression (e.g., in response to an explicit user request). The subject 60 may also select the base avatar to be used when generating the avatar icons 64.

Figure 4:
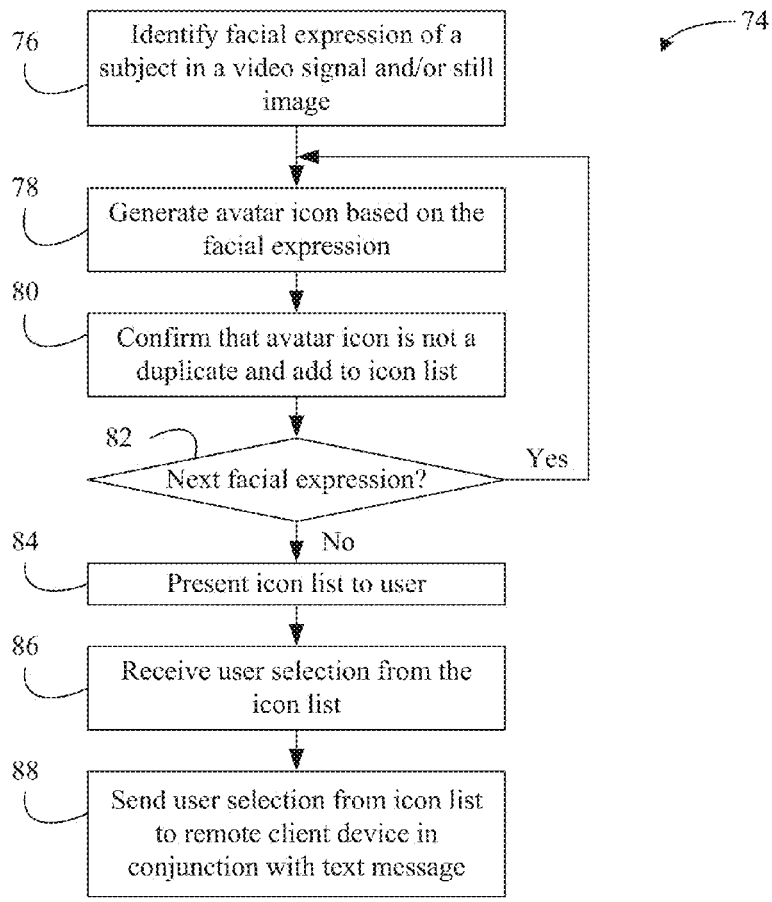
FIG. 4 is a flowchart of an example of a method of conducting avatar icon messaging according to an embodiment.

Turning now to FIG. 4, a method 74 of conducting avatar icon messaging is shown. The method 74 may be implemented in a client device as a set of logic instructions and/or firmware stored in a machine- or computer-readable medium such as RAM, ROM, PROM, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated block 76 provides for identifying a facial expression of a subject in one or more of a video signal and a still image. An avatar icon may be generated based on the facial expression at block 78, wherein illustrated block 80 confirms that the avatar icon is not a duplicate with respect to an icon list. If the avatar icon is not a duplicate, the avatar icon may be added to the icon list, wherein a determination may be made at block 82 as to whether another facial expression is ready for processing. If so, the avatar icon creation process may repeat. Otherwise, block 84 may present the icon list to a user. A user selection from the icon list may be received at block 86, wherein illustrated block 88 sends the user selection of an avatar icon to a remote client device in conjunction with a text message.

Doll Animation

Figure 5:
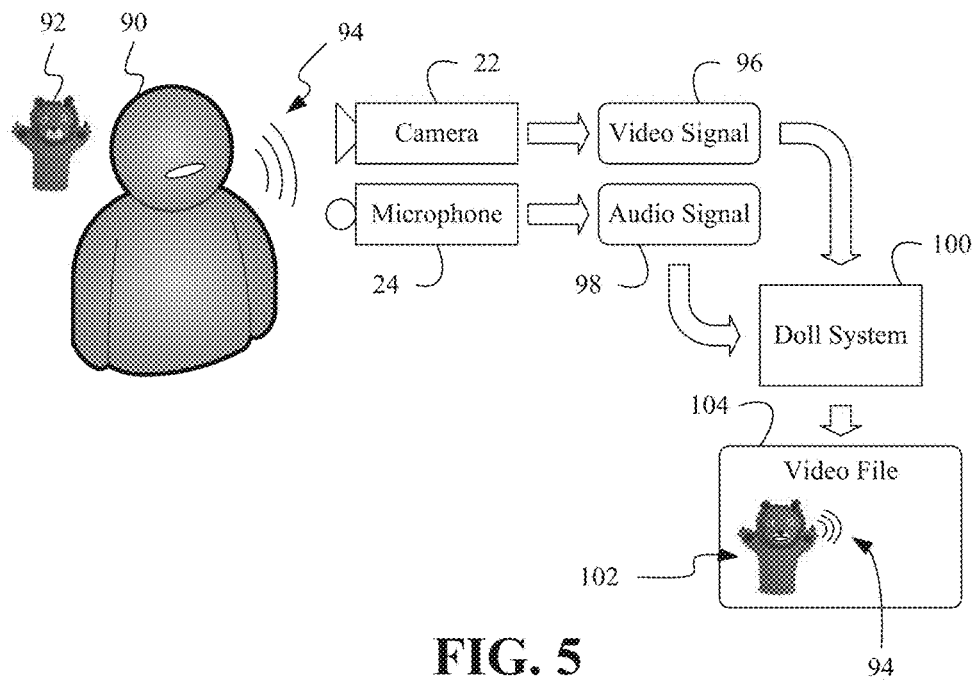
FIG. 5 is a block diagram of an example of an avatar-based doll animation scheme according to an embodiment.

Yet another type of application that may benefit from the techniques described herein is doll animation. FIG. 5 shows an avatar-based doll animation scheme in which a subject 90 manipulates a doll such as a hand puppet 92 and speaks audible content 94 (e.g., words, phrases, sounds), in range of a camera 22 and a microphone 24. Accordingly, the illustrated camera 22 generates a video signal 96 that reflects one or more facial expressions (e.g., mouth shapes, head turns, nods, blinks, frowns, smiles, winks) of the subject 90, as well as the likeness of the hand puppet 92. Similarly, the illustrated microphone 24 generates an audio signal 98 that reflects the audible content 30.

A doll system/application 100 may identify one or more facial expressions of the subject 90 in the video signal 96, generate avatar animation data based on the one or more facial expressions, identify a doll face in the video signal 96, and transfer the avatar animation data to the doll face to obtain a doll animation 102, wherein the doll animation 102 may be used to generate (e.g., encode) a video file 104. In the illustrated example, one or more facial features of the hand puppet 92 have been replaced with facial features and/or expressions that mimic the subject 90 during recording of the video. Additionally, the audible content 94 may be incorporated into the doll animation 102 so that the hand puppet 94 appears to be speaking the same audible content 94. Moreover, a voice tone setting may be identified (e.g., via user preference, speech recognition, and so forth), wherein the tone of the audible content 94 in the video file 104 is changed to create a different intonation and/or audible effect from the original intonation/audible effect of the subject 90. In one example, pitch shifting is used to change the tone of the audible content 94.

Figure 6:
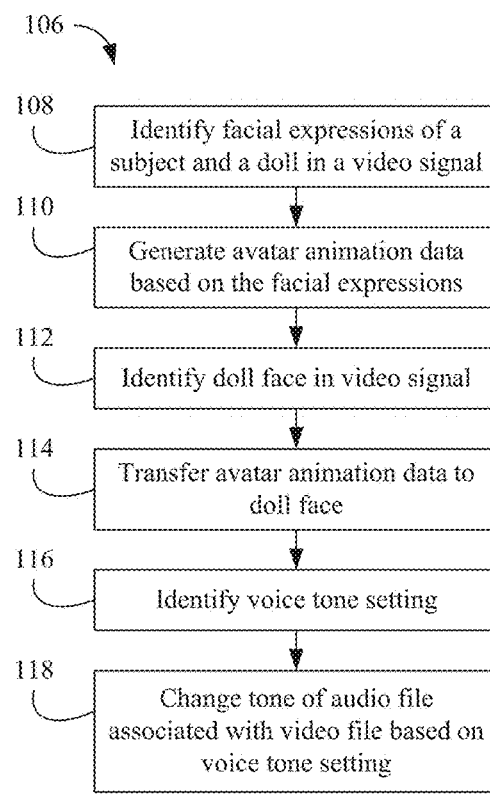
FIG. 6 is a flowchart of an example of a method of conducting avatar-based doll animations according to an embodiment.

Turning now to FIG. 6, a method 106 of conducting avatar-based doll animations is shown. The method 106 may be implemented in a client device as a set of logic instructions and/or firmware stored in a machine- or computer-readable medium such as RAM, ROM, PROM, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated block 108 provides for identifying one or more facial expressions of a subject and a doll in a video signal, wherein avatar animation data may be generated at block 110 based on the facial expressions. Additionally, a doll face may be identified in the video signal at block 112. Block 114 may transfer the avatar animation data to the doll face. In addition, a voice tone setting may be identified at block 116, wherein illustrated block 118 changes a tone of an audio file associated with the video file based on the voice tone setting.

Figure 7A:
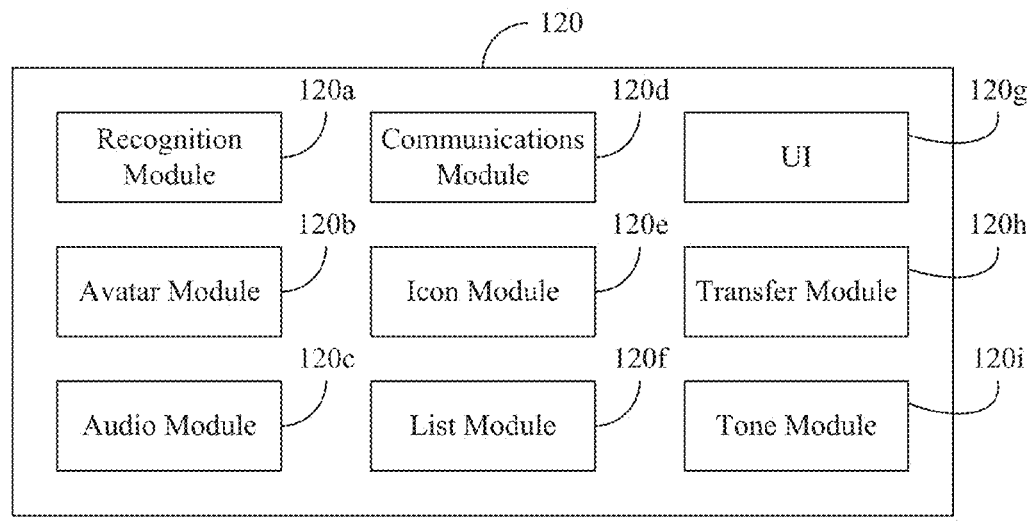
FIGS. 7A and 7B are block diagrams of examples of client devices according to embodiments.

Turning now to FIG. 7A, a computing device 120 (120a-120i) to manage avatars is shown. In the illustrated example, a recognition module 120a identifies one or more facial expressions of a subject in a video signal, and an avatar module 120b generates avatar animation data based on the one or more facial expressions. Additionally, an audio module 120c may incorporate the avatar animation data into an audio file associated with the video signal. The computing device 120 may also include a communications module 120d to send the audio file to a remote client device via a messaging application. Thus, the illustrated computing device 120 may implement an avatar transfer protocol that does not incur high bandwidth costs or rely on dedicated avatar support in the remote peer.

The computing device 120 may also be used to conduct avatar icon messaging. For example, an icon module 120e may generate an avatar icon based on one or more facial expressions in a video signal and/or still image of a subject, wherein a list module 120f may add the avatar icon to an icon list. In one example, the list module 120f confirms that the avatar icon is not a duplicate before adding the avatar icon to the icon list. The illustrated computing device 120 also includes a user interface (UI) that presents the icon list to a user and receives a user selection from the icon list. Thus, the communications module 120d may send the user selection to a remote client device in conjunction with a text message.

Additionally, the computing device 120 may be used to conduct avatar based doll animations. For example, the recognition module 120a may also identify a doll face in a video signal, wherein a transfer module 120h may transfer avatar animation data to the doll face to obtain a doll animation. More particularly, the avatar animation data may correspond to one or more facial expressions of a subject in the video signal so that the doll animation mimics the subject. The illustrated computing device 120 also includes a tone module 120i that identifies a voice tone setting and changes a tone of an audio file associated with the video signal based on the voice tone setting.

Figure 7B:
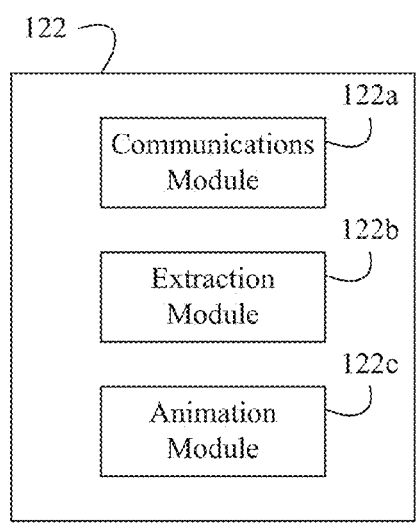

FIG. 7B shows a computing device 122 (122a-122c) to animate avatars. In the illustrated example, a communications module 122a receives an audio file, wherein an extraction module 122b uses the audio file to obtain avatar animation data. In one example, the extraction module 122b retrieves timestamped facial motion data from a free data field of the audio file to obtain the avatar animation data. The extraction module 122b may also retrieve timestamped facial motion data from a link stored in a sound metadata field of the audio file to obtain the avatar animation data. The illustrated computing device 122 also includes an animation module 122c to render an avatar animation based on the audio file and the avatar animation data. In one example, the animation module 122c synchronizes the timestamped facial motion data with the audio file to render the avatar animation.

Figure 8:
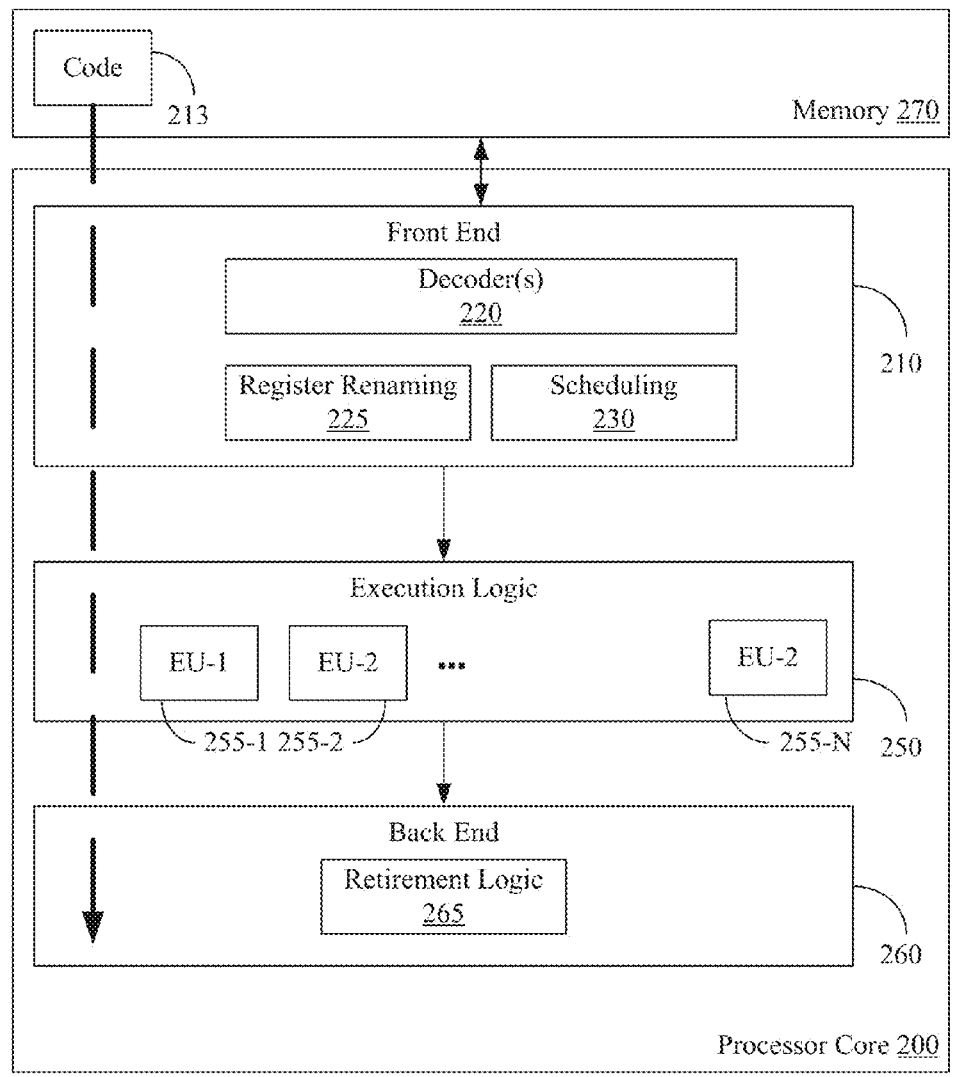
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the method 42 (FIG. 2), the method 74 (FIG. 4) and/or the method 106 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 9:
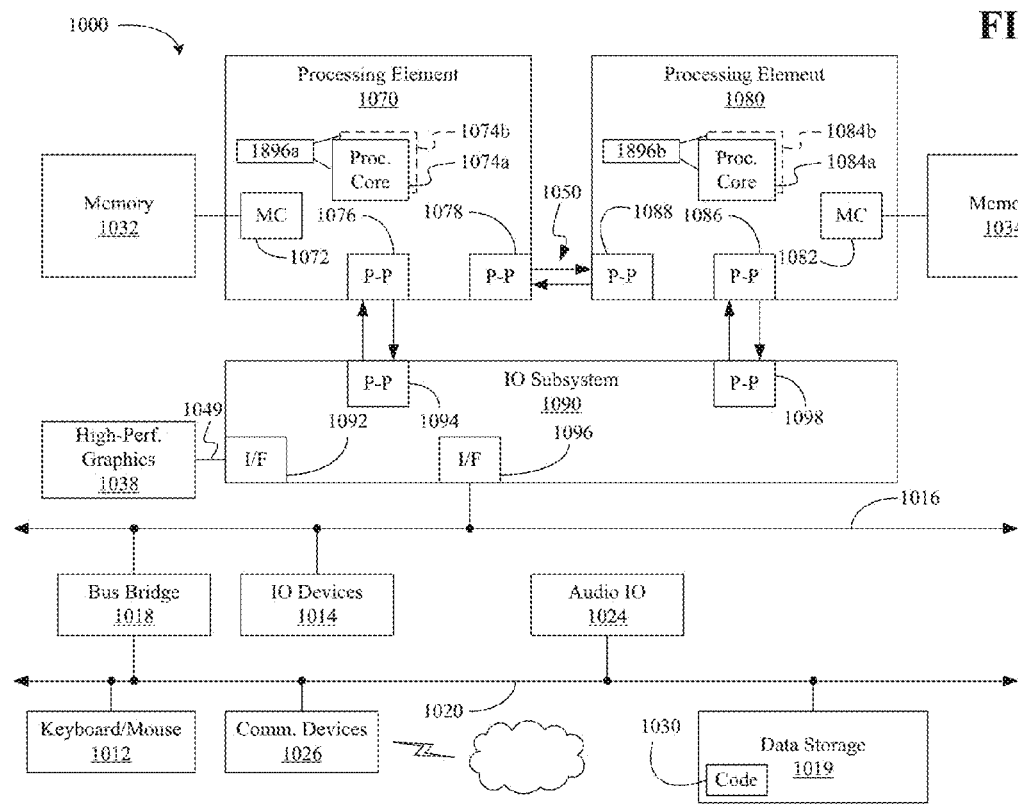
FIG. 9 is a block diagram of an example of a system according to an embodiment.

Referring now to FIG. 9, shown is a block diagram of a system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., cameras) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 42 (FIG. 2), the method 74 (FIG. 4) and/or the method 106 (FIG. 6), and may be similar to the code 213 (FIG. 8), already discussed. Further, an audio I/O 1024 may be coupled to second bus 1020, wherein the audio I/O 1024 may be used to establish a headset connection.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples

Example 1 may include an apparatus to manage avatars, including a recognition module to identify one or more facial expressions of a subject in a video signal. The apparatus may also include an avatar module to generate avatar animation data based on the one or more facial expressions, and an audio module to incorporate the avatar animation data into an audio file associated with the video signal.

Example 2 may include the apparatus of example 1, further including a communications module to send the audio file to a remote client device via a messaging application.

Example 3 may include the apparatus of example 1, wherein the audio module is to store timestamped facial motion data in a free data field of the audio file to incorporate the avatar animation data into the audio file.

Example 4 may include the apparatus of example 1, wherein the audio module is to store a link to timestamped facial motion data in a sound metadata field of the audio file to incorporate the avatar animation data into the audio file.

Example 5 may include the apparatus of any one of examples 1 to 4, further including an icon module to generate an avatar icon based on the one or more facial expressions, a list module to add the avatar icon to an icon list, a user interface to present the icon list to a user and receive a user selection from the icon list, and a communications module to send the user selection to a remote client device in conjunction with a text message.

Example 6 may include the apparatus of example 5, wherein the list module is to confirm that the avatar icon is not a duplicate on the icon list.

Example 7 may include the apparatus of any one of examples 1 to 4, wherein the recognition module is to identify a doll face in the video signal, and wherein the apparatus further includes a transfer module to transfer the avatar animation data to the doll face to obtain a doll animation, and a tone module to identify a voice tone setting and change a tone of the audio file based on the voice tone setting.

Example 8 may include at least one computer readable storage medium having a set of instructions which, if executed by a computing device, cause the computing device to identify one or more facial expressions of a subject in a video signal. The instructions, if executed, may also cause a computing device to generate avatar animation data based on the one or more facial expressions, and incorporate the avatar animation data into an audio file associated with the video signal.

Example 9 may include the at least one computer readable storage medium of example 8, wherein the instructions, if executed, cause a computing device to send the audio file to a remote client device via a messaging application.

Example 10 may include the at least one computer readable storage medium of example 8, wherein the instructions, if executed, cause a computing device to store timestamped facial motion data in a free data field of the audio file to incorporate the avatar animation data into the audio file.

Example 11 may include the at least one computer readable storage medium of example 8, wherein the instructions, if executed, cause a computing device to store a link to timestamped facial motion data in a sound metadata field of the audio file to incorporate the avatar animation data into the audio file.

Example 12 may include the at least one computer readable storage medium of any one of examples 8 to 11, wherein the instructions, if executed, cause a computing device to generate an avatar icon based on the one or more facial expressions add the avatar icon to an icon list, present the icon list to a user, receive a user selection from the icon list, and send the user selection to a remote client device in conjunction with a text message.

Example 13 may include the at least one computer readable storage medium of example 12, wherein the instructions, if executed, cause a computing device to confirm that the avatar icon is not a duplicate on the icon list.

Example 14 may include the at least one computer readable storage medium of any one of examples 8 to 11, wherein the instructions, if executed, cause a computing device to identify a doll face in the video signal, transfer the avatar animation data to the doll face to obtain a doll animation, identify a voice tone setting, and change a tone of the audio file based on the voice tone setting.

Example 15 may include a method of managing avatars, including identifying one or more facial expressions of a subject in a video signal, and generating avatar animation data based on the one or more facial expressions. The method may also provide for incorporating the avatar animation data into an audio file associated with the video signal.

Example 16 may include the method of example 15, further including sending the audio file to a remote client device via a messaging application.

Example 17 may include the method of example 15, wherein incorporating the avatar animation data into the audio file includes storing timestamped facial motion data in a free data field of the audio file.

Example 18 may include the method of example 15, wherein incorporating the avatar animation data into the audio file includes storing a link to timestamped facial motion data in a sound metadata field of the audio file.

Example 19 may include the method of any one of examples 15 to 18, further including generating an avatar icon based on the one or more facial expressions, adding the avatar icon to an icon list, presenting the icon list to a user, receiving a user selection from the icon list, and sending the user selection to a remote client device in conjunction with a text message.

Example 20 may include the method of example 19, further including confirming that the avatar icon is not a duplicate on the icon list.

Example 21 may include the method of any one of examples 15 to 18, further including identifying a doll face in the video signal, transferring the avatar animation data to the doll face to obtain a doll animation, identifying a voice tone setting, and changing a tone of the audio file based on the voice tone setting.

Example 22 may include at least one computer readable storage medium having a set of instructions which, if executed by a computing device, cause the computing device to receive an audio file and use the audio file to obtain avatar animation data. The instructions, if executed, may also cause a computing device to render an avatar animation based on the audio file and the avatar animation data.

Example 23 may include the at least one computer readable storage medium of example 22, wherein the audio signal is to be received from a messaging application of a remote client device.

Example 24 may include the at least one computer readable storage medium of example 22, wherein the instructions, if executed, cause a computing device to retrieve timestamped facial motion data from a free data field of the audio file to obtain the avatar animation data, and synchronize the timestamped facial motion data with the audio file to render the avatar animation.

Example 25 may include the at least one computer readable storage medium of example 22, wherein the instructions, if executed, cause a computing device to retrieve timestamped facial motion data from a link stored in a sound metadata field of the audio file to obtain the avatar animation data, and synchronize the timestamped facial motion data with the audio file to render the avatar animation.

Example 26 may include a method of animating avatars, including receiving an audio file, using the audio file to obtain avatar animation data and rendering an avatar animation based on the audio file and the avatar animation data.

Example 27 may include an apparatus to animate avatars, including a communications module to receive an audio file, an extraction module to use the audio file to obtain avatar animation data, and an animation module to render an avatar animation based on the audio file and the avatar animation data.

Example 28 may include an apparatus to manage avatars, including means for performing any one of examples 15 to 21.

Example 29 may include an apparatus to animate avatars, including means for performing the method of example 26.

Techniques described herein may therefore enable the sharing of avatar animations without incurring high bandwidth costs or relying on dedicated avatar support in the remote peer. Moreover, avatar icons may be generated and incorporated into messaging solutions, wherein the avatar icons may be mimic actual facial features and/or expressions of the sender of the message. Additionally, doll animations may be generated, wherein the doll animations also mimic actual facial features and/or expressions of specific individuals.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus to manage avatars, comprising:
   a camera to capture an image of a subject and an image of a doll;
   a recognition module to identify one or more facial expressions of the subject and a doll face in a video signal generated by the camera;
   an avatar module to generate avatar animation data based on the one or more facial expressions of the subject;
   an audio module to incorporate the avatar animation data into an audio file associated with the video signal, and
   a transfer module,
   wherein the transfer module is to transfer the avatar animation data of the subject and audible content associated with the audio file to the doll face to obtain a doll animation.

2. The apparatus of claim 1, further including a communications module to send the audio file to a remote client device via a messaging application.

3. The apparatus of claim 1, wherein the audio module is to store timestamped facial motion data in a free data field of the audio file to incorporate the avatar animation data into the audio file.

4. The apparatus of claim 1, wherein the audio module is to store a link to timestamped facial motion data in a sound metadata field of the audio file to incorporate the avatar animation data into the audio file.

5. The apparatus of claim 1, further including:
   an icon module to generate an avatar icon based on the one or more facial expressions;
   a list module to add the avatar icon to an icon list;
   a user interface to present the icon list to a user and receive a user selection from the icon list; and
   a communications module to send the user selection to a remote client device in conjunction with a text message.

6. The apparatus of claim 5, wherein the list module is to confirm that the avatar icon is not a duplicate on the icon list.

7. The apparatus of claim 1, wherein the recognition module further includes:
   a tone module to identify a voice tone setting and change a tone of the audio file based on the voice tone setting.

8. At least one non-transitory computer readable storage medium comprising a set of instructions which, if executed by a computing device, cause the computing device to:
   capture an image of a subject and an image of a doll;
   identify one or more facial expressions of the subject and a doll face in a video signal;
   generate avatar animation data based on the one or more facial expressions of the subject;
   incorporate the avatar animation data into an audio file associated with the video signal, and
   transfer the avatar animation data of the subject and audible content associated with the audio file to the doll face to obtain a doll animation.

9. The at least one non-transitory computer readable storage medium of claim 8, wherein the instructions, if executed, cause a computing device to send the audio file to a remote client device via a messaging application.

10. The at least one non-transitory computer readable storage medium of claim 8, wherein the instructions, if executed, cause a computing device to store timestamped facial motion data in a free data field of the audio file to incorporate the avatar animation data into the audio file.

11. The at least one non-transitory computer readable storage medium of claim 8, wherein the instructions, if executed, cause a computing device to store a link to timestamped facial motion data in a sound metadata field of the audio file to incorporate the avatar animation data into the audio file.

12. The at least one non-transitory computer readable storage medium of claim 8, wherein the instructions, if executed, cause a computing device to:
   generate an avatar icon based on the one or more facial expressions;
   add the avatar icon to an icon list;
   present the icon list to a user;
   receive a user selection from the icon list; and
   send the user selection to a remote client device in conjunction with a text message.

13. The at least one non-transitory computer readable storage medium of claim 12, wherein the instructions, if executed, cause a computing device to confirm that the avatar icon is not a duplicate on the icon list.

14. The at least one non-transitory computer readable storage medium of claim 8, wherein the instructions, if executed, cause a computing device to:
   identify a voice tone setting; and
   change a tone of the audio file based on the voice tone setting.

15. A method of managing avatars, comprising:
   capturing an image of a subject and an image of a doll;
   identifying one or more facial expressions of the subject and a doll face in a video signal;
   generating avatar animation data based on the one or more facial expressions of the subject;
   incorporating the avatar animation data into an audio file associated with the video signal, and
   transferring the avatar animation data of the subject and audible content associated with the audio file to the doll face to obtain a doll animation.

16. The method of claim 15, further including sending the audio file to a remote client device via a messaging application.

17. The method of claim 15, wherein incorporating the avatar animation data into the audio file includes storing timestamped facial motion data in a free data field of the audio file.

18. The method of claim 15, wherein incorporating the avatar animation data into the audio file includes storing a link to timestamped facial motion data in a sound metadata field of the audio file.

19. The method of claim 15, further including:
generating an avatar icon based on the one or more facial expressions;
adding the avatar icon to an icon list;
presenting the icon list to a user;
receiving a user selection from the icon list; and
sending the user selection to a remote client device in conjunction with a text message.

20. The method of claim 19, further including confirming that the avatar icon is not a duplicate on the icon list.

21. The method of claim 15, further including:
identifying a voice tone setting; and
changing a tone of the audio file based on the voice tone setting.

22. At least one non-transitory computer readable storage medium comprising a set of instructions which, if executed by a computing device, cause the computing device to:
capture an image of a subject and an image of a doll;
receive an audio file;
receive a video signal that includes facial expressions of the subject and a doll face;
use the audio file to obtain avatar animation data based on the facial expressions of the subject;
render an avatar animation based on the audio file and the avatar animation data, and
transfer the avatar animation data of the subject and audible content associated with the audio file to the doll face to obtain a doll animation.

23. The at least one non-transitory computer readable storage medium of claim 22, wherein the audio signal is to be received from a messaging application of a remote client device.

24. The at least one non-transitory computer readable storage medium of claim 22, wherein the instructions, if executed, cause a computing device to:
retrieve timestamped facial motion data from a free data field of the audio file to obtain the avatar animation data; and
synchronize the timestamped facial motion data with the audio file to render the avatar animation.

25. The at least one non-transitory computer readable storage medium of claim 22, wherein the instructions, if executed, cause a computing device to:
retrieve timestamped facial motion data from a link stored in a sound metadata field of the audio file to obtain the avatar animation data; and
synchronize the timestamped facial motion data with the audio file to render the avatar animation.

* * * * *